United States Patent

Amelio et al.

[11] Patent Number: 5,694,763
[45] Date of Patent: Dec. 9, 1997

[54] LOW OBSERVABLE ENGINE INLET SYSTEM

[75] Inventors: Armand F. Amelio, Yonkers, N.Y.; Richard S. Barnard, Monroe; James J. Manzolli, Seymour, both of Conn.

[73] Assignee: United Technologies Corporation, Hartford, Conn.

[21] Appl. No.: 507,686

[22] Filed: Apr. 11, 1990

[51] Int. Cl.[6] ............................................. F02C 7/055
[52] U.S. Cl. ........................... 60/39.092; 137/15.2
[58] Field of Search ...................... 60/39.092, 39.093, 60/223; 137/15.1, 15.2

[56] References Cited

U.S. PATENT DOCUMENTS

| | | | |
|---|---|---|---|
| 4,291,530 | 9/1981 | Ballard | 60/39.09 P |
| 4,397,431 | 8/1983 | Ben-Porat | 60/39.093 |
| 4,745,740 | 5/1988 | Dunn et al. | 60/234 |

*Primary Examiner*—Michael J. Carone

[57] ABSTRACT

A turbine engine inlet system includes a curved duct 14 to deliver air to the engine, an inlet lip 16 to smooth the entry of air flowing into the duct, a forward inlet section 18 submerged within the aircraft skin contour to provide a degree of ram recovery to the duct, and a movable air deflector 20 which is flush with the forward inlet section 18 during normal flight conditions and extended to slightly above the inlet lip 16 during icing conditions.

6 Claims, 3 Drawing Sheets

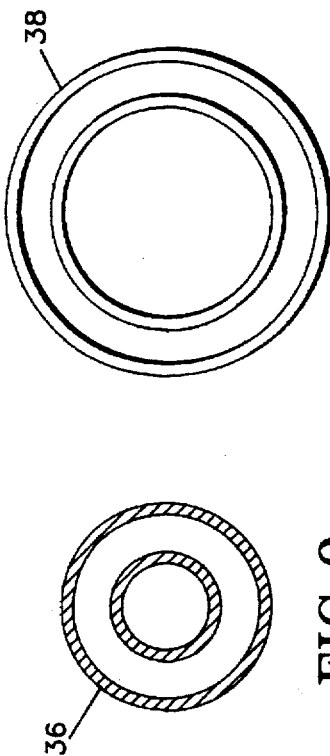
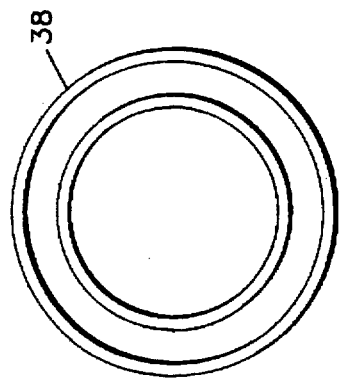
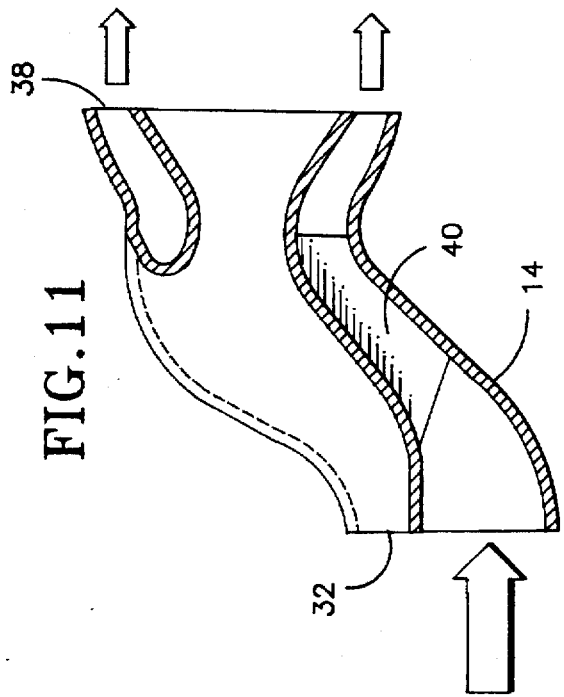
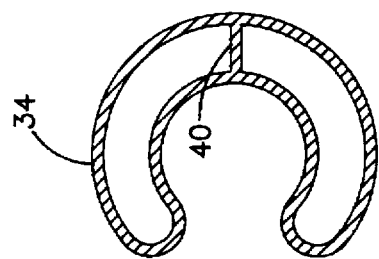
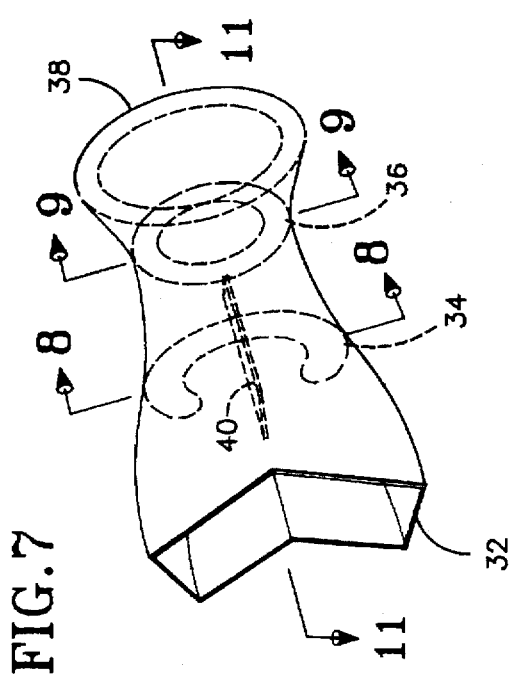

LOW OBSERVABLE ENGINE INLET SYSTEM

TECHNICAL FIELD

This invention relates to turbine engine air inlets, and more particularly, an inlet system which provides low radar observability and improved ice and foreign object engine damage protection.

BACKGROUND ART

Conventional rotorcraft turbine engine air inlet systems are usually designed, within the constraints of the overall aircraft mission requirements, for maximum ram recovery to maximize engine power available and for minimum surface area to minimize aircraft penalties for power for inlet anti-icing. These design goals typically result in short, forward facing, inlets with minimum turning.

The advent of low radar observability requirements has introduced additional requirements for inlet designs which are, to a degree, inharmonious with the desire for high performance and low anti-ice power. Direct line-of-sight to the engine front face must be avoided because turbine engine compressor vanes are highly visible to radar scanning devices. Avoiding this typically requires longer ducts with more turns which, consequently, decreases inlet pressure (head) thereby decreasing engine power available and increases inlet surface area thereby increasing anti-ice power requirements. In addition, newer structural materials used for lowering radar observability have increased heat transfer resistance relative to conventional materials which results in an increase in the anti-ice power required per unit area of duct surface to maintain the surface ice-free. Thus radar observability requirements have two adverse impacts on inlet anti-icing power requirements; the additional turning for line-of-sight requirements increases duct surface area; and new duct materials increase anti-ice power per unit surface area. The combined effect results in significant increases in the energy, either electrical or bleed air, that must be provided for inlet anti-icing. This increased energy requirement leads in turn to either an increased size, weight, and power penalty for larger aircraft electrical generators or to higher levels of engine bleed air energy extraction which results in direct reduction of engine power available. Either case results in a significant impact on aircraft performance due to the reduction in power available to the rotor.

Additionally, buried engine installations, as opposed to engines mounted in pods external to the fuselage proper, are desirable from a radar observability viewpoint. On conventional rotorcraft where buried engines are employed for other reasons, it is typical to include a means to prevent the ice and/or slush which can accumulate on adjacent fuselage surfaces ahead of a forward-facing inlet from entering the inlet and representing a foreign airborne object hazard to the engine. Sometimes, the inlet inner surface is offset from the fuselage skin creating a gap which acts to prevent ingestion. In other cases, an external screen is employed to prevent ingestion. Neither of these means is desirable from a radar observability viewpoint.

Another concern with conventional forward facing inlets is ingestion of ice deliberately shed from other aircraft surfaces such as rotor blades which are protected by de-icing rather than anti-icing systems. An external screen is often used to address this concern as well. Again, a screen is not desirable for low radar observability.

A low radar observable engine inlet which meets the above mentioned requirements is, therefore, highly desirable.

DISCLOSURE OF THE INVENTION

The object of the present invention is to provide for a low radar observable rotorcraft engine inlet with optimal RAM air recovery, minimal anti-icing power requirements, and ice/slush FOD protection.

According to the present invention, a rotorcraft engine inlet includes a fuselage inlet section which is depressed into the contour of the helicopter and has inlet lips for creating vortex airflow to augment airflow into a short, curved inlet duct which delivers air to the engine. A moveable air deflector extends outward from the fuselage inlet section for FOD and icing protection when needed.

The present invention has separate operational modes for normal forward flight (maximum ram recovery) conditions and icing/FOD conditions to give the aircraft maximum effectiveness. When in the normal mode, the movable deflector is in the retracted position and the inlet pressure loss is a minimum. The inlet turning, shape, and structural material provide low radar observability. In the anti-icing mode, the deflector is extended to reduce anti-ice power requirements and to provide protection against ingestion of ice or slush from other aircraft surfaces. The fact the deflector when extended still remains within overall aircraft contours provides low radar observability in both modes.

These and other objects, features and advantages of the present invention will become more apparent in the light of the detailed description of exemplary embodiments thereof, as illustrated by the drawings.

BRIEF DESCRIPTION OF THE DRAWINGS

FIG. 7 is a perspective view of the internal duct of the present invention.

FIG. 8 is a sectional view taken along line 8—8 of FIG. 7.

FIG. 9 is a sectional view taken along line 9—9 of FIG. 7.

FIG. 10 is an end view of the exit end of the internal duct of the present invention.

FIG. 11 is a sectional view taken along line 11—11 of FIG. 7.

BEST MODE FOR CARRYING OUT THE INVENTION

Figure 1:
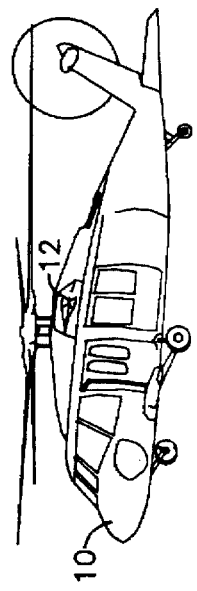
FIG. 1 is a perspective view of a helicopter.

Referring now to FIG. 1, a helicopter 10 includes turbine engines (not shown) which receive air through engine inlets 12, only one of which is shown.

Figure 2:
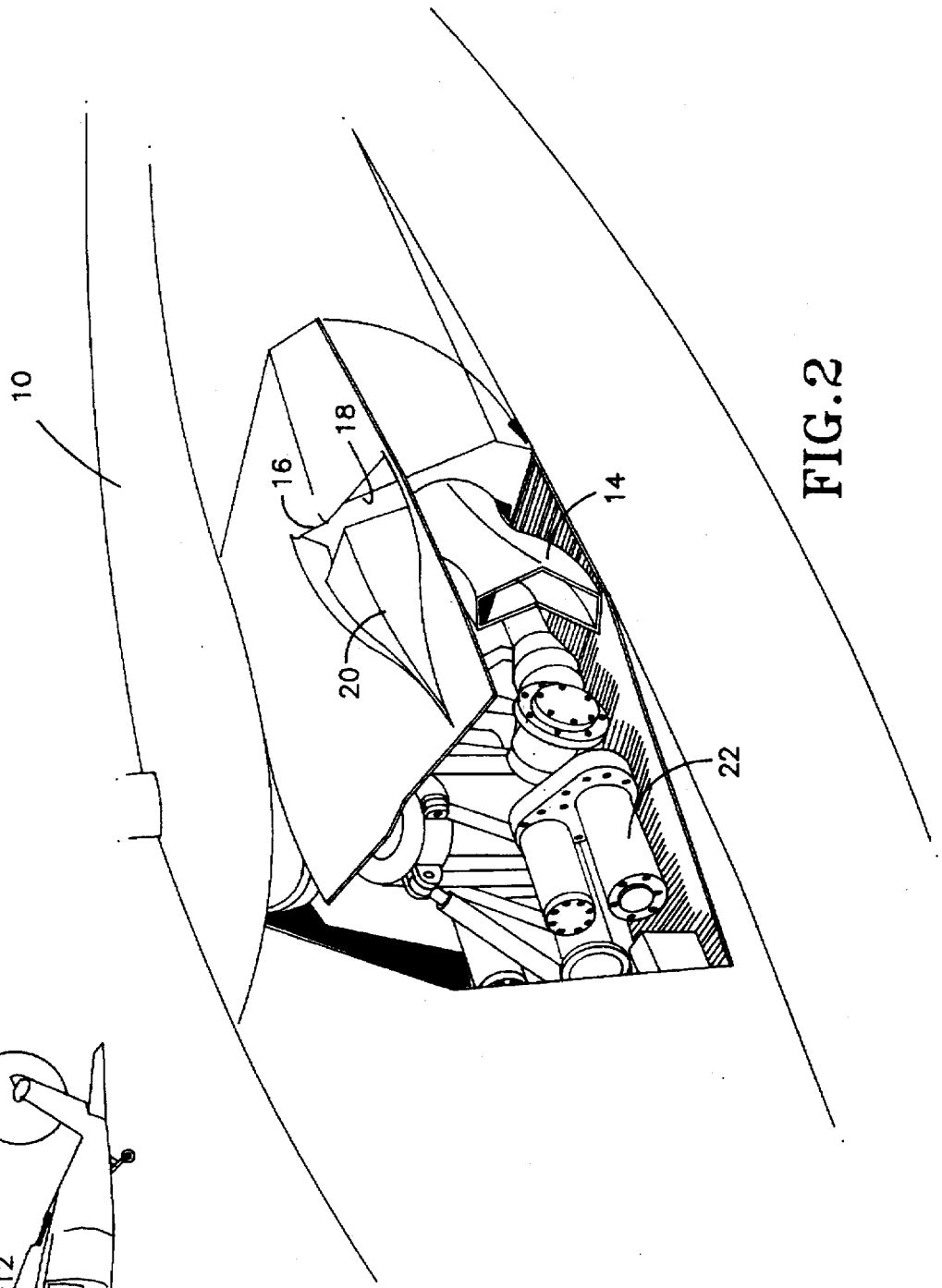
FIG. 2 is a perspective view partly broken away of the helicopter engine inlet of FIG. 1.

Referring now to FIG. 2, the helicopter 10 engine inlet system of the present invention includes an internal air intake duct 14, inlet lips 16, forward inlet section 18 and extendable air deflector 20. The external portions 16,18,20 of the engine inlet system are formed as part of the aircraft surface which, once removed, reveals the transmission 22 (for powering the rotor system) and internal air duct 14 (for delivering air to the engine, which is not shown).

Figure 3:
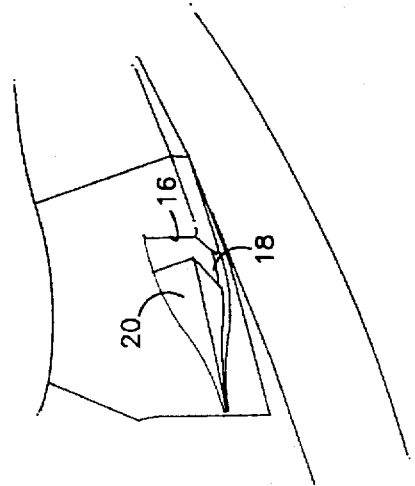
FIG. 3 is a perspective view partly broken away of the forward inlet section of the present invention with the air deflector in the stored position.
Figure 4:
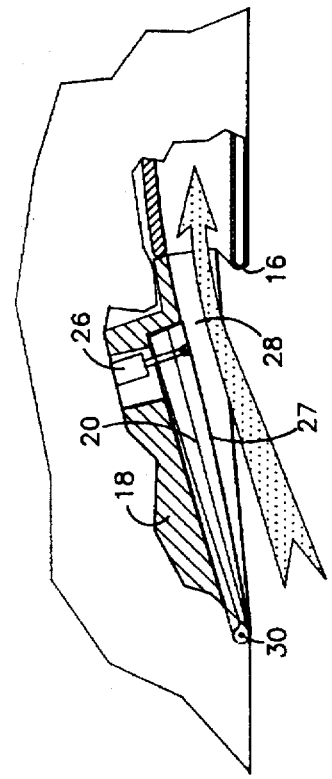
FIG. 4 is a plan view partly broken away and partly in section of the forward inlet section of the present invention with the air deflector in the stored position.

Referring now to FIGS. 3 and 4, the position of the air deflector 20 is controlled by an actuator 26 which pivots the deflector about a point 30. In the stored position, the outer surface 27 rests contiguous with the outer surface of forward inlet section 18. Together they form a trough 28 which captures air to be delivered to duct 14. Lip 16 has a smooth, rounded, leading edge in order to smooth the entry of air into duct 14 (minimizing any turbulence which might otherwise occur) and also to minimize radar returns. Lip 16 also has a cavity to which warm, engine bleed air may be delivered for anti-icing purposes.

Figure 5:
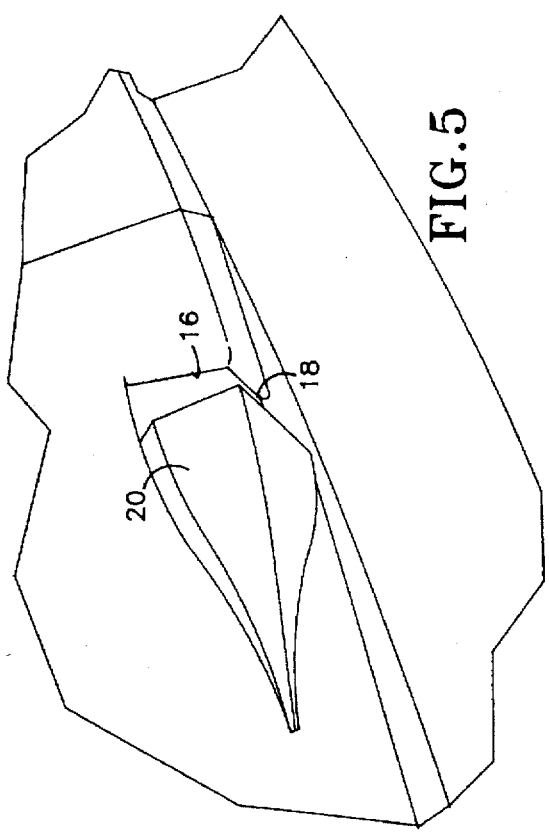
FIG. 5 is a view similar to FIG. 3 but with the air deflector in the extended position.
Figure 6:
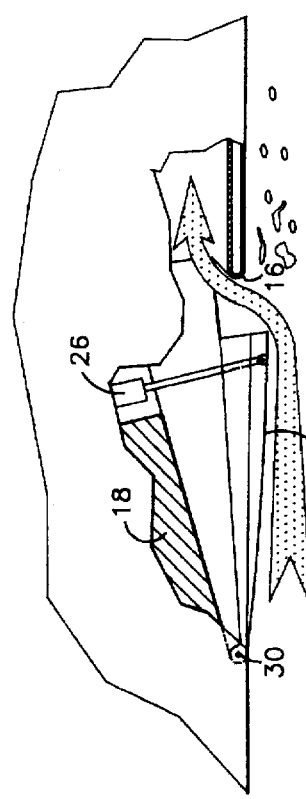
FIG. 6 is a view similar to FIG. 4 but with the air deflector in the extended position.

Referring now to FIG. 5 and 6, actuator 26 is extended during icing or FOD conditions to angle air deflector 20 outboard of inlet lip 16 to deflect ice or slush (which detaches from aircraft surfaces forward of the inlet area) or other airborne objects away from duct 14. It is therefore not necessary to anti-ice the deflector 20. The functioning of deflector 20 also reduces the anti-ice power requirements of duct 14 because ice accretion is slowed by the fact that larger airborne water droplets cannot make the turn around the deflector 20 aft edge and into duct 14.

Deflector 20 may be constructed of solid material as shown, or screen or mesh material which would provide similar radar characteristics of a solid deflector but would allow air to pass through while still blocking foreign airborne objects.

Referring now to FIGS. 7–10, the cross-sectional shape of duct 14 changes from a chevron shape at inlet point 32, to a rounded U-shape at point 34, to a small annulus at point 36, to a larger annulus at outlet point 38. The annulus shape at outlet 38 matches the turbine engine face, which is not shown. The shape of duct 14 minimizes direct line-of-sight to the engine front face while minimizing airflow turbulence and thus engine power losses. The chevron shape of the duct at point 32 also minimizes radar observability. A vane 40 may be attached inside duct 14 to even further block direct line-of-sight through the engine with the drawback that it must be electrically de-iced.

Referring now to FIG. 11, airflow enters duct 14 at the chevron-shaped inlet 32 and exits at point 38. Direct line-of-sight from inlet 32 to exit 38 is minimized by the curved shape of the duct.

The two mode operation of the present invention takes advantage of the fact that increased air density during cold, icing conditions increases available engine power. Extending the deflector, therefore, doesn't limit aircraft performance during the time it is predominately needed.

In the retracted position (i.e., when the deflector is positioned approximately contiguous with the bottom edge of the duct) the system takes maximum advantage of ram recovery for increased engine performance. Furthermore, fewer edges are exposed in the retracted mode, which edges would adversely impact radar signature characteristics.

Although the invention has been shown and described with exemplary embodiments thereof, it should be understood by those skilled in the art that the foregoing and various other changes, omissions and additions may be made therein and thereto without departing from the spirit and the scope of the invention.

We claim:

1. An aircraft turbine engine inlet for an aircraft having a skin contour, comprising:

a duct for directing air to the aircraft engine having a face which protrudes above the aircraft skin contour and having at least one bend for preventing direct line of sight to the aircraft engine, said face having a top edge and a bottom edge;

an inlet lip formed in the aircraft surface over said top edge of said face having a rounded leading edge for preventing air turbulence in said duct; and a forward section in the aircraft skin forward of and adjacent to said bottom edge of said face having a movable deflector, and means for positioning said movable deflector wherein said deflector is positioned approximately contiguous with said bottom edge during nodal flight and positioned approximately contiguous with said top edge under appropriate circumstances in order to deflect foreign airborne objects away from said duct.

2. The aircraft turbine engine inlet according to claim 1 wherein said duct is further comprised of means for providing anti-icing.

3. The aircraft turbine engine inlet according to claim 1, wherein said inlet lip is hollow to allow for bleed engine air heating.

4. The aircraft turbine engine inlet according to claim 1, wherein said face is chevron shaped.

5. The aircraft turbine engine inlet according to claim 1, wherein said movable deflector is chevron shaped.

6. The aircraft turbine engine inlet according to claim 1, wherein said deflector is constructed of screen or mesh material.

* * * * *